(12) United States Patent
Grünenwald et al.

(10) Patent No.: US 9,080,500 B2
(45) Date of Patent: Jul. 14, 2015

(54) DEVICE FOR EXCHANGING HEAT FOR GASES CONTAINING ACIDS

(75) Inventors: Bernd Grünenwald, Nürtingen (DE); Wolfgang Knödler, Waiblingen (DE)

(73) Assignee: MAHLE BEHR GMBH & CO. KG, Stuttgart (DE)

( * ) Notice: Subject to any disclaimer, the term of this patent is extended or adjusted under 35 U.S.C. 154(b) by 0 days.

(21) Appl. No.: 11/720,479

(22) PCT Filed: Dec. 12, 2005

(86) PCT No.: PCT/EP2005/013289
§ 371 (c)(1),
(2), (4) Date: May 30, 2007

(87) PCT Pub. No.: WO2006/063759
PCT Pub. Date: Jun. 22, 2006

(65) Prior Publication Data
US 2008/0190403 A1    Aug. 14, 2008

(30) Foreign Application Priority Data
Dec. 13, 2004   (DE) .......................... 10 2004 060 154

(51) Int. Cl.
*F02B 47/08* (2006.01)
*F02M 25/07* (2006.01)
*B32B 15/01* (2006.01)
*F28F 13/18* (2006.01)
(Continued)

(52) U.S. Cl.
CPC .............. *F02B 29/0462* (2013.01); *C23F 13/14* (2013.01); *C23F 13/16* (2013.01); *F02M 25/0737* (2013.01); *F28F 19/06* (2013.01); *F28F 21/084* (2013.01); *F02B 29/0406* (2013.01); *F02M 25/0709* (2013.01); *F28D 21/0003* (2013.01); *F28D 2021/0082* (2013.01); *Y02T 10/121* (2013.01); *Y02T 10/146* (2013.01)

(58) Field of Classification Search
CPC ........ F02B 47/08; F02M 25/07; B32B 15/01; F28F 13/18; F28F 19/02
USPC ............. 123/568.12, 568.11, 559.1; 428/654; 165/133
See application file for complete search history.

(56) References Cited

U.S. PATENT DOCUMENTS 2,821,014 A * 1/1958 Miller ........................... 428/654
3,728,783 A * 4/1973 Chartet .......................... 228/207
(Continued)

FOREIGN PATENT DOCUMENTS

DE    699 01 905 T2    1/2003
DE    103 27 847 A1    5/2004
(Continued)

OTHER PUBLICATIONS

Office Action mailed Mar. 8, 2012 in related European application No. 05 821 777.9 (7 pgs.).
(Continued)

*Primary Examiner* — Mahmoud Gimie
*Assistant Examiner* — David Hamaoui
(74) *Attorney, Agent, or Firm* — Foley & Lardner LLP

(57) ABSTRACT

Device for exchanging heat between an acidiferous gas and a heat transfer medium, with at least one flow duct for the acidiferous gas which consists essentially of aluminum and/or an aluminum alloy.

14 Claims, 2 Drawing Sheets

(51) Int. Cl.
 F28F 19/02 (2006.01)
 F02B 29/04 (2006.01)
 C23F 13/14 (2006.01)
 C23F 13/16 (2006.01)
 F28F 19/06 (2006.01)
 F28F 21/08 (2006.01)
 F28D 21/00 (2006.01)

(56) References Cited

U.S. PATENT DOCUMENTS

| | | | |
|---|---|---|---|
| 4,106,449 A * | 8/1978 | Matsumoto et al. | 123/568.12 |
| 4,137,102 A * | 1/1979 | Althoff et al. | 428/457 |
| 4,357,397 A * | 11/1982 | Baba et al. | 428/654 |
| 4,560,625 A * | 12/1985 | Kaifu et al. | 428/654 |
| 4,727,001 A * | 2/1988 | Takemoto et al. | 428/654 |
| 5,125,452 A * | 6/1992 | Yamauchi et al. | 165/133 |
| 5,277,358 A * | 1/1994 | Cottone et al. | 228/219 |
| 5,302,342 A * | 4/1994 | Kawabe et al. | 420/546 |
| 5,744,255 A * | 4/1998 | Doko et al. | 428/654 |
| 6,129,143 A * | 10/2000 | Hasegawa et al. | 165/133 |
| 6,316,126 B1 * | 11/2001 | Hasegawa et al. | 428/654 |
| 6,391,476 B2 * | 5/2002 | Wittebrood et al. | 428/654 |
| 6,523,606 B1 * | 2/2003 | Dienhart et al. | 165/144 |
| 6,568,584 B2 * | 5/2003 | Wittebrood et al. | 228/219 |
| 6,596,413 B2 * | 7/2003 | Wittebrood et al. | 428/652 |
| 6,599,645 B2 * | 7/2003 | Wittebrood | 428/654 |
| 6,627,330 B1 * | 9/2003 | Shimizu et al. | 428/654 |
| 6,635,360 B2 * | 10/2003 | Takeno et al. | 428/654 |
| 6,652,990 B2 * | 11/2003 | Carey et al. | 428/647 |
| 6,687,995 B1 * | 2/2004 | Sucke et al. | 29/890.043 |
| 6,786,210 B2 | 9/2004 | Kennedy et al. | |
| 6,796,484 B2 * | 9/2004 | Wittebrood et al. | 228/249 |
| 6,815,086 B2 * | 11/2004 | Dockus et al. | 428/650 |
| 6,880,746 B2 * | 4/2005 | Seseke-Koyro et al. | 228/223 |
| 6,913,184 B2 * | 7/2005 | Dockus et al. | 228/56.3 |
| 7,011,080 B2 | 3/2006 | Kennedy | |
| 7,077,190 B2 * | 7/2006 | Hayashi et al. | 165/159 |
| 7,226,669 B2 * | 6/2007 | Benedictus et al. | 428/654 |
| 7,250,223 B2 * | 7/2007 | Miyachi et al. | 428/654 |
| 7,255,932 B1 * | 8/2007 | Kilmer | 428/654 |
| 7,514,155 B2 * | 4/2009 | Benedictus et al. | 428/654 |
| 8,002,905 B2 * | 8/2011 | Boger et al. | 148/24 |
| 2001/0007720 A1 * | 7/2001 | Soga et al. | 428/654 |
| 2001/0047861 A1 * | 12/2001 | Maeda et al. | 165/167 |
| 2002/0078566 A1 * | 6/2002 | Torigoe et al. | 29/890.03 |
| 2003/0155409 A1 * | 8/2003 | Dockus et al. | 228/245 |
| 2003/0234009 A1 | 12/2003 | Kennedy et al. | |
| 2004/0038070 A1 * | 2/2004 | Dockus et al. | 428/652 |
| 2004/0177898 A1 * | 9/2004 | Magnusson | 148/255 |
| 2005/0006066 A1 * | 1/2005 | Emrich et al. | 165/133 |
| 2005/0056263 A1 | 3/2005 | Kennedy | |
| 2006/0086486 A1 * | 4/2006 | Sudo | 165/143 |
| 2006/0283580 A1 * | 12/2006 | Usui | 165/133 |

FOREIGN PATENT DOCUMENTS

| | | |
|---|---|---|
| EP | 1 391 679 A2 | 2/2004 |
| JP | 58-182096 A | 10/1983 |
| JP | 62-206387 A | 9/1987 |
| JP | 4371368 A | 12/1992 |
| JP | 5039994 A | 2/1993 |
| JP | 9-88614 A | 3/1997 |
| JP | 9310139 A | 12/1997 |
| WO | WO 0070291 A1 * | 11/2000 |

OTHER PUBLICATIONS

Office Action issued Mar. 22, 2011 in related Japanese Application No. 2007-544839 (2 pages).

* cited by examiner

DEVICE FOR EXCHANGING HEAT FOR GASES CONTAINING ACIDS

SUMMARY

The invention relates to a device for exchanging heat between an acidiferous gas and a heat transfer medium, with at least one flow duct for the acidiferous gas. The invention further relates to a device for supplying combustion air to an internal combustion engine, with a suction pipe, a compression element, a charge-air tube and a charge-air cooler arranged in the charge-air tube, with at least one flow duct for charge-air, wherein the combustion air can be mixed in the suction pipe or in the charge-air tube with exhaust gas from an exhaust gas recirculation tube and then guided through the charge-air cooler.

In such devices, for example in the case of air-cooled or even coolant-cooled systems, particularly charge-air coolers through which recirculated exhaust gas flows, in the case of a low pressure exhaust gas recirculation in diesel engines, corrosion problems arise in the charge-air cooler due to the relatively low temperatures that lie below the dew point of the gas constituents, since low-sulfur exhaust gas condensate and, if applicable, also chlorides from the suction air accumulate, for example. Charge-air coolers for these applications are for this reason normally manufactured from stainless steels.

Under certain circumstances one objective of the invention is to improve devices of the type already mentioned, and in particular to design them to be simpler and/or less expensive in terms of manufacture. In particular, essential components of a heat transfer system, particularly a charge-air cooler, such as tubes, tube plates, air reservoirs and the like, should be protected from deep-seated corrosion by an acidiferous gas.

According to the present invention a device for exchanging heat has at least one, preferably two or more flow ducts for an acidiferous gas, which ducts consist essentially of aluminum or an aluminum alloy.

An acidiferous gas, within the meaning of the present invention, is a gas which is intentionally or unintentionally enriched with solid and/or liquid additives which themselves, or in aqueous solution, have a pH value of less than 7, and in particular less than 5. An example of an acidiferous gas is the exhaust gas of an internal combustion engine, particularly a diesel engine, containing sulfur oxides or sulfuric acid, or the charge-air for an internal combustion engine after it has been mixed with recirculated exhaust gas.

According to the present invention a device for supplying combustion air to an internal combustion engine has a suction pipe for air containing oxygen, in particular ambient air, a compression element, for example a turbocharger, and a charge-air tube. A charge-air cooler with at least one, preferably two or more flow ducts for the charge-air, is arranged in the charge-air tube. An exhaust air recirculation tube opens into the suction pipe or into the charge-air tube in front of the charge-air cooler so that the combustion air can be mixed with exhaust gas and the mixture can be guided through the charge-air cooler. The flow duct or ducts for the charge-air consist essentially of aluminum or an aluminum alloy.

To prevent or retard destruction of the flow duct or ducts due to the acid content of the gas, the flow duct or ducts are preferably provided with corrosion protection. The corrosion protection is preferably designed as a coating, plating, particularly solder plating, a turbulence liner and/or fin. An inside of the flow duct is preferably completely covered with the corrosion protection. Under certain circumstances, however, an incomplete covering, if necessary associated with a saving in expenditure, e.g. due to cracks, pores or fissures in a coating or plating, is sufficient.

According to one embodiment the corrosion protection has electrochemically base areas which are provided with cathodic corrosion protection for areas of the flow duct to be protected, e.g. a core material. Here complete coating of the area to be protected with a base material is not absolutely necessary, but instead base partial areas may also be sufficient, for example in the form of liners, particularly turbulence liners or fins. Likewise, the coating is only required in areas which are in contact with the corrosive gas, and here in particular a partial surface coating is sufficient. In particular, individual parts are hard soldered together. The soldering may, in particular, be carried out in a vacuum or under protective gas with or without fluxes.

Because of an electrochemical potential difference between areas to be protected and a corrosion protection that is baser than them, the corrosion protection oxidizes or corrodes, but not the more noble areas to be protected. The corrosion protection therefore serves as a sacrificial anode. The corrosion protection preferably increases the pH value of the acidiferous gas or of the acid media contained in it due to its oxidation.

The electrochemical potential difference between areas to be protected and base areas of the corrosion protection is preferably at least 20 mV, in particular at least 50 mV. A particularly preferred protection is provided where the potential difference is at least 100 mV.

To guarantee good corrosion protection of the areas to be protected, the surfaces in contact with a corrosive medium are coated with a base metal, a base phase or a base alloy. Alternatively (or additionally) these surfaces are connected electrically conductively to such a base area.

A core material of the flow duct preferably consists of an aluminum alloy in the AA3xxx series, particularly of AA3003 or AA3005, or of a modification normal in the construction of heat transfer systems and/or of pure aluminum (AA1xxx), particularly AA1145 or AA1050, or of a modification normal in the construction of heat transfer systems and/or of a copper-containing aluminum alloy in the AA2xxx series, or of a modification normal in the construction of heat transfer systems and/or of an aluminum alloy in the AA6xxx series, particularly of AA6063 or of a modification normal in the construction of heat transfer systems. In the case of welded tubes or other welded components in particular, an increased copper content (>0.5% by weight) is desirable. In the case of extruded tubes the same preferably consist of AA3xxx aluminum alloy or a modification normal in the construction of heat transfer systems or AA1xxx pure aluminum or a modification normal in the construction of heat transfer systems.

Zinc is preferably provided as the base metal. In the case of a base alloy or phase, the same preferably has a zinc, tin, indium and/or vanadium content.

According to a preferred embodiment turbulence liners and/or fins are provided in the flow duct, these linings or fins on the one hand improving efficiency and on the other serving as a sacrificial anode, with the result that the turbulence liners/fins first corrode before the core material is then attacked.

In a preferred embodiment the flow duct and the liner/fin are unplated and the liner/fin then forms the corrosion protection. In advantageous variants either the flow duct or the liner/fin or both is provided with a solder plating so that the flow duct and the liner/fin can be soldered together. Advantageous embodiments provide a corrosion protection preferably formed as a plating, either for the flow duct or for the liner/fin, or for both.

According to a preferred embodiment the flow duct has a four- or five-layer structure consisting of a core material, a solders plating inside and outside, and a corrosion protection layer on the inside and/or outside particularly preferably arranged underneath the solder plating.

According to a variant the flow duct only has one corrosion protection layer on the inside and is provided with a solder plated turbulence liner and/or fin.

The turbulence liners and/or fins preferably consist—related to the core areas to be protected—of a base material or are coated with a base metal, a base phase or a base alloy. Turbulence liners containing zinc are advantageous, for example.

The turbulence liners and/or fins preferably consist of one of the aluminum alloys mentioned above for the flow duct, particularly zinc-containing or zinc-free AA3xxx or of a modification normal in the construction of heat transfer systems, or of an aluminum alloy in the AA7xxx series, in particular AlZn1, or of a modification normal in the construction of heat transfer systems, or in the AA8xxx series, particularly AA8006, AA8011 or AA8079, or a modification normal in the construction of heat transfer systems.

An AlSi solder plating is preferably provided, wherein the plating has base elements and the silicon content of the solder plating lies within the range from 4 to 15% by weight, particularly from 5 to 12% by weight, the zinc content lies within the range from 0.05 to 10% by weight, particularly from 0.2 to 5% by weight, and the indium, tin and/or vanadium content lies in a range from 0.0 to 0.3% by weight. The base elements are preferably zinc and/or indium.

The thickness of a plating is preferably as constant as possible and is 2 to 40%, in particular 2 to 20%, and in particular 5 to 20% of the thickness of the core material, particularly on its thinnest side.

A multi-layer plating is preferably provided in which a protective plating is provided underneath an AlSi solder plating that is slightly more noble or baser than the AlSi solder plating that is baser than the area to be protected.

A device according to the present invention is preferably hard soldered using a zinc-containing flux, where a zinc-containing surface is produced by the zinc-containing flux in the connecting areas, which surface serves under certain circumstances as an (additional or exclusive) sacrificial anode.

BRIEF DESCRIPTION OF THE DRAWINGS

The invention is explained in detail in the following with reference to several exemplary embodiments with reference to the drawings, in which.

DETAILED DESCRIPTION

Figure 1:
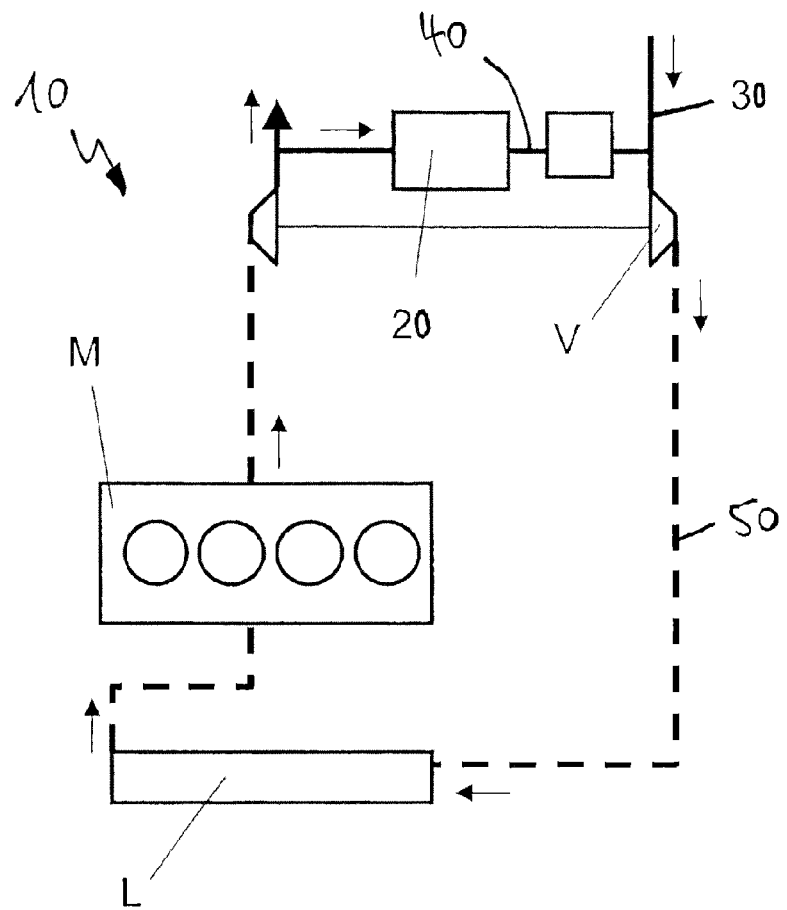
FIG. 1 shows a device for supplying combustion air to an internal combustion engine according to the present invention.

FIG. 1 shows a system 10 with a low pressure exhaust gas recirculation as an example of a device according to the invention for supplying combustion air to an internal combustion engine M. The pipes on the low pressure side are denoted by continuous lines, those on the high pressure side by broken lines. The directions of flow are each denoted by arrows.

FIG. 1 shows an example of a low pressure exhaust gas recirculation in which the acidiferous exhaust gas to be recirculated is branched from the exhaust gas flow from engine M on the low pressure side, i.e. after a reduction in pressure. It is supplied to a suction pipe 30 via exhaust gas recirculation tube 40, in which an exhaust gas cooler 20 is preferably arranged, and is there mixed with non-acidiferous ambient air. The acidiferous mixture is sucked in by compressor V, preferably an exhaust gas turbocharger, and fed as compressed charge-air into charge-air tube 50.

The charge-air is cooled by charge-air cooler L arranged in the charge-air tube and is then fed to engine M. Here charge-air cooler L has, according to the invention, a multiplicity of flow ducts for charge-air, which consist essentially of aluminum or an aluminum alloy.

In a similar exemplary embodiment, not shown, the exhaust gas recirculation tube is arranged on the high pressure side, therefore branches from the exhaust gas tube between the engine and the turbine of the exhaust gas turbocharger, and opens into the charge-air tube between the compressor and the charge-air cooler.

Figure 2:
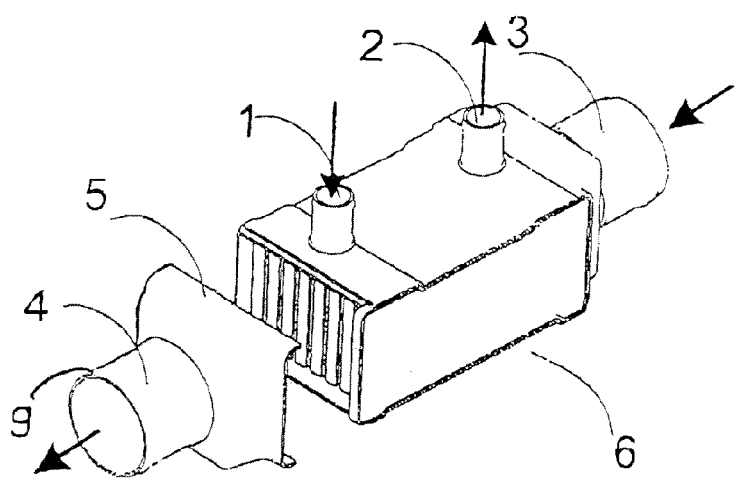
FIG. 2 shows a device for exchanging heat between an acidiferous gas and a heat transfer medium according to the present invention.
Figure 3:
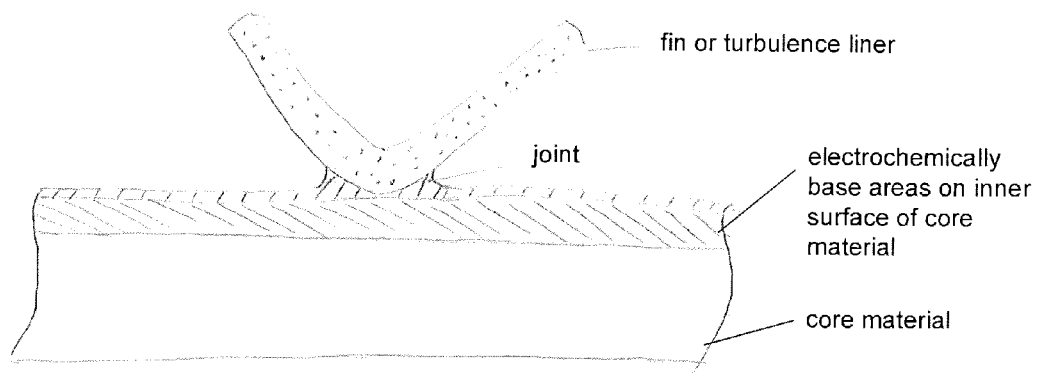
FIG. 3 shows a schematic cross sectional view of a portion of a flow duct for acidiferous gas according to an embodiment of the present invention.

FIG. 2 shows a heat exchanger according to the invention in a partial exploded view, as used, for example, as an exhaust gas cooler or charge-air cooler. The reference numbers 1 and 2 refer to a supply and discharge for a preferably liquid coolant. This coolant is preferably water, particularly water with additives such as glycol, from the cooling circuit. However, other coolants may be provided, both in a gaseous and a liquid phase.

Reference numbers 3 and 4 refer to a supply and a discharge of acidiferous gas, for example of the exhaust gas or charge-air. The supply and discharge are designed in the form of inlet or outlet flanges, which can each be connected to a further supply pipe. These connections may either be made by pushing a tube with a larger circumference over the flanges, or by inserting a tube with a smaller circumference into the opening. A bead 9, which provides a more stable connection between the supply pipe and the flange, is preferably provided on each of the flanges.

Reference number 6 refers to a housing for the heat exchange device. The supply and discharge for the coolant, and the supply and discharge for the acidiferous gas, as well as cover device 5 and the cover device opposing it, do not form part of this housing.

According to an exemplary embodiment an exhaust gas cooler is provided consisting of air reservoirs, tubes and plates, each manufactured from an AA3003 aluminum alloy. Here an AlSi solder plating, which is as flat as possible but not necessarily fully continuous, is provided on the tubes and plates in the areas coming into contact with the exhaust gas, in this case with a silicon content of approx. 8-12% by weight, and with zinc, the zinc content being approx. 2-4% by weight. Furthermore, the AlSi solder plating contains small quantities of indium, tin and vanadium (each <0.3% by weight) and a small portion of other contaminants. The plating thickness is here 5-15% of the tube wall thickness.

According to a variant a suitable AlSi solder plating is provided on the air reservoirs in the areas coming into contact with the exhaust gas.

On the inside of the exhaust gas cooler are arranged turbulence liners or fins for improving the efficiency of the cooler, which liners or fins consist, according to the first exemplary embodiment, of pure aluminum (in this case in the AA1145 series), with a solder plating corresponding to the solder plating of the tubes and plates.

Because of the electrochemical potential difference (in this case over 100 mV) between the noble core area and the base coating (solder plating) the base coating (particularly the zinc constituent) oxidizes or corrodes. This has the effect that the corrosive attack takes place superficially and, in particular, is not deep-seated, i.e. in the form of pitting or intercrystalline corrosion. Here, as an additional subsidiary effect, the hydrogen ions present are reduced, under certain circumstances, so that the pH value of the exhaust gas condensate shifts to more non-critical, higher values.

According to a further exemplary embodiment an exhaust gas cooler is provided with turbulence liners of an aluminum alloy in the AA7xxx series, in this case AlZn1, which is far baser than the components of the exhaust gas cooler to be protected, so that the turbulence liners corrode first.

As a further exemplary embodiment an exhaust gas cooler is provided with a core area (air reservoirs, tubes and plates) which has an AA3003 aluminum alloy without zinc. Over it is provided a layer (approx. 5% of the tube wall thickness) of AA3003 aluminum alloy with zinc, and over this a layer (10% of the tube wall thickness) in the form of an AlSi solder plating is provided. Here the layers are, in particular, continuous both in the areas which are in contact with the exhaust gas and in all the other areas.

According to a variant the coats are only provided in partial areas which are in contact with the exhaust gas, and they need not necessarily be designed so that they are continuous.

According to a further exemplary embodiment a heat transfer system is provided with MPE ("multi-port extrusion") tubes, in particular of AA1050 pure aluminum, which system has been soldered for adjusting a suitable zinc diffusion profile when soldering by means of a zinc-containing flux. For this reason a zinc-rich surface is provided in the soldered areas of air reservoirs/tubes/plates/fins. According to an exemplary embodiment the heat transfer system therefore has turbulence liners inside some or all of the tubes. According to a variant the heat transfer device is designed without turbulence liners.

Each of the coatings and platings described is preferably already applied to the base material or semi-finished product before the device is manufactured. However, it is also possible to apply them to the inside of the flow ducts after they have been manufactured. In both cases it is particularly preferable to apply the corrosion protection in conjunction with an organic or inorganic bonding agent so that the corrosion protection is arranged at least before a soldering process in a chemically or physically bound matrix on an inside of the corresponding flow duct.

The tubes in all the exemplary embodiments are preferably extruded, folded from plates, soldered and/or welded. In addition to the tube nest design described, a corresponding design of other gas-conducting devices, e.g. in packet, disk or stacked disk design is also possible.

The Following Dimensions are Particularly Advantageous
Indirect Exhaust Gas Heat Exchanger In the case of an indirect exhaust gas heat exchanger the hot exhaust gas is cooled by a coolant, in particular a liquid coolant, e.g. water or another liquid, which is in turn cooled in another heat exchanger, particularly in a coolant cooler. The coolant is preferably cooled in the coolant cooler with air.

Direct Exhaust Gas Heat Exchanger:

In a direct exhaust gas heat exchanger the hot exhaust gas is cooled directly by a coolant, particularly a gaseous coolant, e.g. air.

The "exhaust gas duct height" is, in particular, the height of the flow ducts in which the exhaust gas flows through the exhaust gas heat exchanger.

The "coolant duct height" is, in particular, the height of the flow ducts in which the coolant flows through the exhaust gas heat exchanger.

The "coolant flow length" is, in particular, the length of the flow path along which the coolant flows in the exhaust gas heat exchanger, in particular the total length of the exhaust gas heat exchanger.

The "exhaust gas flow length" is, in particular, the length of the flow path along which the exhaust gas flows in the exhaust gas heat exchanger, in particular the total length of the exhaust gas heat exchanger.

The "exhaust gas tube wall thickness" is, in particular, the thickness of the tube wall of the tube in which the exhaust gas flows in the exhaust gas heat exchanger.

The "exhaust gas tube width" is, in particular, the width of the tube in which the exhaust gas flows through the exhaust gas heat exchanger.

The "coolant fin density" is, in particular, the number of turbulence-producing elements, such as prominences, winglets, outward or inward embossing in turbulence liners, per one decimeter of length inserted in the coolant duct or tube.

The "coolant fin thickness" is, in particular, the thickness of the material of the turbulence-producing element, such as the turbulence liner in particular, which is inserted into the tube or duct in which the coolant flows.

The "exhaust gas fin thickness" is, in particular, the thickness of the material of the turbulence-producing element, such as the turbulence liner in particular, which is inserted into the tube or duct in which the exhaust gas flows.

The "exhaust gas duct height:coolant duct height" is, in particular, the ratio of the height of the duct in which the exhaust flows to the height of the duct in which the coolant flows.

The "longitudinal coolant fin pitch" is, in particular, the distance between a turbulence-producing element, in particular an outward or inward embossing in a tube and/or in a turbulence liner, and a turbulence-producing element adjacent to it, particularly in the direction of flow of the coolant.

The "longitudinal winglet pitch or exhaust gas longitudinal winglet pitch" is, in particular, the distance between a turbulence-producing element, particularly an outward or inward embossing in a tube and/or in a turbulence liner, and a turbulence-producing element adjacent to it, particularly in the direction of flow of the exhaust gas.

The "winglet angle" is, in particular, the angle between a turbulence-producing element, particularly an outward or inward embossing in a tube and/or in a turbulence liner, and a turbulence-producing element arranged adjacent to it, particularly essentially perpendicular to the direction of flow of the exhaust gas.

The "upper to lower shell winglet displacement" is essentially the distance, particularly in the direction of flow of the exhaust gas, of a turbulence-producing element, particularly an outward or inward embossing in a tube and/or in a turbulence liner, from the nearest turbulence-producing element arranged on the opposing tube or duct side.

The "winglet height to duct height [%]" is the height of a turbulence-producing element, particularly an outward or inward embossing in a tube and/or in a turbulence liner, to the height of the duct in which the coolant or exhaust gas flows, multiplied by a factor of 100.

The "winglet length:winglet height" is the ratio of the length to the height of a turbulence-producing element, particularly an outward or inward embossing in a pipe and/or in a turbulence liner.

The "cooling air duct height" is, in particular, the height of the flow ducts in which the cooling air flows through the exhaust gas heat exchanger.

The "cooling air flow length" is, in particular, the length of the flow path along which the cooling air flows in the exhaust gas heat exchanger, in particular the total length of the exhaust gas heat exchanger.

The "cooling air fin density" is, in particular, the number of turbulence-producing elements, such as prominences, winglets, outward or inward embossing in turbulence liners, per decimeter of length, which are inserted in the cooling air duct/tube.

The "cooling air fin thickness" is, particular, the thickness of the material of the turbulence-producing element, particularly the turbulence liner, which is inserted in the tube or duct in which the cooling air flows.

The "transverse winglet density" is the number of turbulence-producing elements, such as prominences, winglets, outward or inward embossing in turbulence liners per decimeter of length.

Indirect Exhaust Gas Heat Exchanger:

| Characteristic | Particularly advantageous | Advantageous |
|---|---|---|
| Exhaust gas duct height [mm] | 4.5-6 | 3-15 |
| Coolant duct height [mm] | 1.5-3.2 | 1-3 |
| Coolant flow length [mm] | ~80-~700 | 50-1000 |
| Exhaust gas flow length [mm] | ~80-~700 | 50-1000 |
| Exhaust gas tube wall thickness [mm] | 0.4-0.5 | 0.25-0.5 |
| Exhaust gas tube width [mm] | 13.5-40 | 10-200 |
| Coolant fin density [Ri/dm] | 20-36 | 15-120 |
| Coolant fin thickness [mm] | 0.1-0.3 | 0.06-1.5 |
| Exhaust gas fin thickness | 0.15-0.3 | 0.06-0.5 |
| Exhaust gas duct height:coolant duct height [—] | 1.4:1 to 4:1 | 0.75:1 to 10:1 |
| Longitudinal coolant fin pitch [mm] | 4-10 | 1-infinity |
| Longitudinal winglet pitch [mm] | 11-40 | 8-200 |
| Longitudinal exhaust gas fin pitch [mm] | 4-16 | 1-infinity |
| Winglet angle [°] | 20-50 | 15-55 |
| Upper to lower shell winglet displacement [mm] | 0-27 | 0-200 |
| Winglet height to duct height [%] | 20-40 | 10-50 |
| Winglet length:winglet height | | 1:1 to 1:10 |

Exhaust Gas Cooler (Direct):

| Characteristic | Particularly advantageous | Advantageous |
|---|---|---|
| Exhaust gas duct height [mm] | 4.5-6 | 2-10 |
| Cooling air duct height [mm] | 4-8 | 1-10 |
| Cooling air flow length [mm] | ~20-~80 | 10-1000 |
| Exhaust gas flow length [mm] | ~50-~800 | 50-1000 |
| Exhaust gas tube wall thickness [mm] | 0.4-0.42 | 0.25-0.5 |
| Tube width | 13.5-40 | 10-200 |
| Cooling air fin density [Ri/dm] | 20-40 | 10-120 |
| Cooling air fin thickness [mm] | 0.08-0.2 | 0.04-0.5 |
| Exhaust gas duct height:cooling air duct height [—] | 0.5:1 to 2:1 | 0.75:1 to 7.5:1 |
| Longitudinal charge-air fin pitch [mm] | 4-10 | 1-1000 |
| Longitudinal exhaust gas winglet pitch [mm] | 11-40 | 4-200 |
| Longitudinal exhaust gas fin pitch [mm] | 4-16 | 1-infinity |
| Exhaust gas winglet angle [°] | 20-50 | 15-55 |
| Upper to lower shell winglet displacement [mm] | 0-27 | 0-200 |
| Winglet height to duct height [%] | 20-40 | 10-50 |
| Transverse winglet density [Wi/dm] | 7.5-17.5 | 5-18 |
| Winglet length:winglet height | 3:1 | 1:1 to 10:1 |

The characteristics of the different exemplary embodiments may be mixed in any combination. The invention may also be applied to areas other than those shown.

The invention claimed is:

1. A system comprising:
    an exhaust gas source; and
    a soldered device that is operatively connected to the exhaust gas source such that the soldered device receives exhaust gas from the exhaust gas source, the soldered device being configured to exchange heat between the exhaust gas and a heat transfer medium, and the soldered device comprising:
        at least one flow duct configured to allow a flow of the exhaust gas therethrough, wherein the at least one flow duct comprises a core consisting essentially of aluminum, an aluminum alloy, or a combination thereof;
        at least one fin located in the flow duct and consisting essentially of an electrochemically base metal, an electrochemically base phase, or an electrochemically base alloy;
        a solder plating attaching the at least one flow duct to the at least one fin, wherein the solder plating comprises a base material, a silicon content within a range of 8 to 12% by weight, and a zinc content within a range of 2 to 4% by weight; and
        an additional corrosion protection surface located on the solder plating, the additional corrosion protection surface being a surface formed by a hard soldering operation using a flux,
        wherein the soldering plating, the at least one fin, and the additional corrosion protection surface provide cathodic corrosion protection that covers all inner surfaces of the flow duct as areas of the at least one flow duct to be protected, wherein an electrochemical potential difference between the areas of the at least one flow duct to be protected and electrochemically base areas of the corrosion protection is at least 50 mV, and wherein the electrochemically base metal, electrochemically base phase, or electrochemically base alloy of the at least one fin is electrochemically base relative to the core of the at least one flow duct, such that the at least one fin provides corrosion protection.

2. The system according to claim 1, wherein the soldered device is an exhaust gas cooler, a charge air cooler, or a combination thereof.

3. The system according to claim 1, wherein the electrochemical potential difference between the areas of the at least flow duct to be protected and the electrochemically base areas is at least 100 mV.

4. The system according to claim 1, wherein the base metal of the at least one fin is zinc, tin, indium or vanadium.

5. The system according to claim 1, wherein the base alloy or the base phase of the at least one fin is provided with zinc, tin, indium, vanadium, or a combination thereof.

6. The system according to claim 1, wherein the corrosion protection is connected electrically and conductively to a corresponding area.

7. The system according to claim 1, wherein the core of the flow duct consists essentially of an aluminum alloy in the AA3xxx series, pure aluminum, a copper-containing aluminum alloy in the AA2xxx series, or an aluminum alloy in the AA6xxx series.

8. The system according to claim 1, wherein the at least one fin consists essentially of an aluminum alloy in the AA3xxx series, an aluminum alloy in the AA7xxx series, or an aluminum alloy in the AA8xxx series.

9. The system according to claim 1, wherein the at least one fin consists of uncoated refined steel.

10. The system according to claim 1, wherein the solder plating further comprises indium, tin and/or vanadium, wherein a content of the indium, tin, and/or vanadium in the solder plating is less than or equal to 0.3% by weight.

11. The system according to claim 1, wherein the solder plating further comprises indium, wherein a content of the indium in the solder plating is less than or equal to 0.3% by weight.

12. The system according to claim 1, wherein the solder plating has a largely constant thickness of 2 to 40% of a wall thickness of the flow duct at its thinnest point.

13. The system according to claim 1, wherein the additional corrosion protection surface is a surface formed by a hard soldering operation performed in a vacuum or under protective gas using the flux.

14. The system according to claim 1, wherein the additional corrosion protection surface is a zinc-containing surface formed by a hard soldering operation using a zinc-containing flux.

* * * * *